3,188,341
BIS(HYDROGEN PHOSPHONATE) DIESTERS OF GLYCOLS AND PROCESS FOR MAKING SAME
John C. Smith, Brad H. Miles, and Leonard Levine, Lake Jackson, Tex., assignors to The Dow Chemical Company, Midland, Mich., a corporation of Delaware
No Drawing. Filed July 26, 1962, Ser. No. 212,725
13 Claims. (Cl. 260—461)

This invention relates to novel esters of phosphorous acid having the formula:

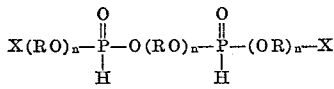

wherein R is an alkylene radical containing 2 to about 8 carbon atoms, $n$ is an integer from 1 to about 3 and X is Cl or Br.

The new phosphonates can be conveniently prepared by the reaction of two moles of $PX_3$ with three moles of the glycol $HO(RO)_n$—H wherein R, $n$ and X are as defined above. As a by-product there is produced four moles of HX. Thus, the course of the reaction can be followed by the amount of HCl or HBr evolved. It is preferred that this HX be removed as such rather than being neutralized with an acid acceptor. To facilitate removal of the HX, as well as to aid in mixing and control of the temperature of the reaction mixture, it is preferred to conduct the reaction in an inert solvent in which HX is substantially insoluble. Suitable such solvents include the halogenated aliphatic hydrocarbons, such as $CH_2Cl_2$, $CHCl_3$, $CCl_4$, $C_2Cl_4$, $CCl_2CHCl$, and the like.

Generally, somewhat better results are obtained by adding the glycol to the $PX_3$ rather than vice versa.

The reactants are employed in an amount such that the exact equivalence is maintained as near as possible, i.e., there should be 1 hydroxyl group for each halogen in the phosphorous trihalide. This predetermines a molar ratio of 3 moles of the dihydroxy compound with 2 moles of the phosphorus trihalide. If an excess of glycol is employed, products containing hydroxyl groups will be formed and if an excess of phosphorus trihalide is employed, products containing active halogen will be formed. Neither of these products is desirable since either renders the compositions of the present invention unsuitable for their intended utility.

Preferably, the reaction, which is essentially quantitative with regard to yields, is run at a temperature of from 0° to 30° C. but temperatures as high as 50° may be used as well as temperatures as low as −10° C. If the temperature much exceeds 50° C., side reactions occur which produce acidic by-products. In general, the reaction is preferably run at atmospheric pressure but on occasion it may be advantageous to reduce the pressure to facilitate the removal of hydrogen halide.

The dihydroxy compounds or glycols useful in making the phosphonates are those of the type $$HO(RO)_n—H$$

wherein R and $n$ are as defined above. However, the hydroxyls preferably should not be more than about 10 atoms apart. Representative suitable compounds include ethylene glycol, propylene glycol, diethylene glycol, dipropylene glycol, triethylene glycol, 1,2-, 2,3- and 1,4-butanediol, 1,6-hexanediol, and the like.

The following examples serve to illustrate the practice of the present invention, all parts being by weight.

GENERAL PROCEDURE

Into a reaction vessel equipped with a means for stirring, temperature control, purging, reactant addition, and refluxing was placed a solution of phosphorus trichloride dissolved in about twice its weight of dry chloroform. To this mixture were added the glycol dropwise, with stirring, while the temperature of the mixture was maintained at 15°–30° C. During the reaction, dry nitrogen was employed to help purge HCl and after 3 to 6 hours, HCl evolution ceased. The pressure was reduced in order to remove the chloroform and the product was obtained as a clear liquid having the analysis shown in Table I. Table I shows the glycol used, the molar ratio of glycol to $PCl_3$, reaction conditions and product obtained.

Table I.—Phosphonates

| Ex. | Glycol Used | Molar Ratio, Glycol/$PCl_3$ | Reaction | | Product | | |
|---|---|---|---|---|---|---|---|
| | | | Temp., °C. | Time, Hr. | Percent P | Percent Cl | Percent PH |
| 1 | Ethylene | 1.50 | 15 | 6 | 20.0 | 21.8 | 19.7 |
| 2 | Diethylene | 1.50 | 30 | 3 | 15.7 | 11.0 | 14.2 |
| 3 | 1,2-Propylene | 1.74 | 25 | 2 | | | |
| 4 | 1,2-Propylene | 1.22 | 15 | | | | |
| 5 | {1,2-Propylene / Ethylene} | {1.00 / .50} | 25 | | | | 16.5 |

In addition to the analyses shown, the structure of the products was confirmed by infra-red spectroscopy.

The compounds of the invention are useful as chemical intermediates, as plasticizers for synthetic resins and as fire-proofing agents. In the latter use they are particularly useful in polyurethane foams, for which purpose as little as 0.5 percent of phosphorus, based on total reactants, contributes improved fire resistance while 1.75 percent renders most such resins self-extinguishing.

We claim:
1. Compounds having the formula:

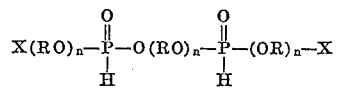

wherein R is an alkylene radical containing from 2 to about 8 carbon atoms, each $n$ is an independently selected integer from 1 to 3 and X is a halogen having an atomic number from 17 to 35.
2. A compound as defined in claim 1 wherein R is the ethylene radical.
3. A compound as defined in claim 1 wherein R is the propylene radical.
4. A compound as defined in claim 1 wherein $n$ is 1.
5. A compound as defined in claim 1 wherein $n$ is 2.
6. A compound as defined in claim 1 wherein X is Cl.
7. The compound having the formula:

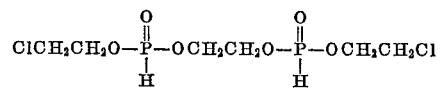

8. The compound having the formula:

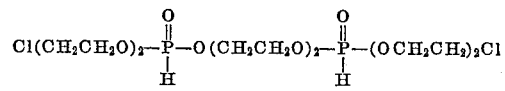

9. The compound having the formula:

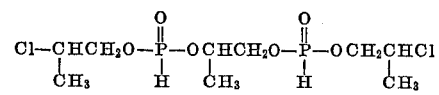

10. The method for making a compound having the formula:

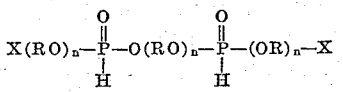

wherein R is an alkylene radical containing 2 to about 8 carbon atoms, $n$ is an integer from 1 to 3 and X is a halogen having an atomic number from 17 to 35, comprising reacting by contacting at a temperature of about $-10°$ to $50°$ C. a phosphorus halide, $PX_3$, with about 1.5 molecular equivalents of a glycol, $HO(RO)_nH$, wherein R, $n$ and X are as previously defined, said contacting being effected by adding the glycol to the $PX_3$.

11. The process as defined in claim 10 wherein the $PX_3$ is dissolved in an inert solvent in which HX is substantially insoluble.

12. The process defined in claim 10 wherein the $PX_3$ is $PCl_3$ and is dissolved in a chlorinated aliphatic hydrocarbon solvent, after which the glycol is added thereto.

13. The process defined in claim 11 wherein the solvent is a halogenated aliphatic hydrocarbon.

References Cited by the Examiner
UNITED STATES PATENTS

| | | | |
|---|---|---|---|
| 2,241,244 | 5/41 | Conary et al. | 260—461 |
| 2,859,094 | 11/58 | Schmitt et al. | 260—461 |

OTHER REFERENCES

Pudovik et al., "Zhurnal Obschei Khimii," No. 31, 1961, pp. 2052–2057.

CHARLES B. PARKER, *Primary Examiner*.
MORRIS LIEBMAN, *Examiner*.